(12) United States Patent
Jarka (10) Patent No.: US 12,116,136 B2
(45) Date of Patent: Oct. 15, 2024

(54) AIRCRAFT INFORMATION SYSTEMS, AIRCRAFT THAT INCLUDE THE SYSTEMS, METHODS OF UTILIZING THE SYSTEMS, AND METHODS OF CONFIGURING THE SYSTEMS

(71) Applicant: The Boeing Company, Chicago, IL (US)

(72) Inventor: Matthew Scott Jarka, Maricopa, AZ (US)

(73) Assignee: THE BOEING COMPANY, Arlington, VA (US)

( * ) Notice: Subject to any disclaimer, the term of this patent is extended or adjusted under 35 U.S.C. 154(b) by 308 days.

(21) Appl. No.: 17/531,526

(22) Filed: Nov. 19, 2021

(65) Prior Publication Data
US 2023/0159171 A1    May 25, 2023

(51) Int. Cl.
*B64D 11/06*     (2006.01)
*B64D 45/00*     (2006.01)
*G08G 5/00*      (2006.01)

(52) U.S. Cl.
CPC .......... *B64D 11/0691* (2014.12); *B64D 45/00* (2013.01); *G08G 5/003* (2013.01)

(58) Field of Classification Search
CPC ............ B64D 11/0691; B64D 11/0689; B64D 45/00; B64D 43/00; B64D 47/00; B64D 11/0015; B64D 2011/0038; B64D 2203/00; B64D 2045/007; B64D 47/02; B64D 11/00; G08G 5/003; G02F 1/13; G02F 1/15; G02F 1/167; H04B 7/18508; H04B 10/11; H02J 2310/44; H02J 2310/40; G10K 2210/1281; G09G 2380/12; G09G 2320/0693; G09G 2354/00; G09G 5/12;
(Continued)

(56) References Cited

U.S. PATENT DOCUMENTS 6,807,538 B1 * 10/2004 Weinberger ............. G06F 16/40
8,930,310 B2 *  1/2015 Rodgers .................... G06F 8/61
                                                        707/637

(Continued)

FOREIGN PATENT DOCUMENTS

WO    WO 2013/147991 A1    10/2013

OTHER PUBLICATIONS

Why_Airbus_Aircraft_Have_Side_Sticks_While_Boeings_Have_Yokes_-_Simple_Flying.pdf (Year: 2020).*

*Primary Examiner* — Fadey S. Jabr
*Assistant Examiner* — Faris Asim Shaikh
(74) *Attorney, Agent, or Firm* — Kolitch Romano Dascenzo Gates LLC (57) ABSTRACT

Aircraft information systems, aircraft that include the aircraft information systems, methods of utilizing the aircraft information systems, and methods of configuring the aircraft information systems are disclosed herein. The aircraft information systems include a fixed computing device configured to be fixedly installed within an aircraft. The fixed computing device is programmed to provide a cabin function interface that provides cabin functionality for a cabin attendant of the aircraft and also to provide a mechanic function interface that provides mechanic functionality for a mechanic for the aircraft. The aircraft include a fuselage, at least one wing, at least one engine, and the aircraft information systems.

9 Claims, 2 Drawing Sheets

(58) Field of Classification Search
CPC ..... G09G 2370/16; G06F 16/48; G06F 3/017;
G06F 3/04817; G06F 3/0488; G06F
3/1423; G01R 31/36; G01R 31/3835;
G01R 31/2863; B64C 2027/8236; Y10S
707/99934; G07C 5/008; G08C 17/00;
G08C 17/02; B64F 5/60; A63F 2300/516;
H04H 20/62; H04L 2012/4028; H04L
2101/604; H04L 61/5007; H04L 2101/69;
H04L 61/5038; H04L 69/08; H04L
67/565; H04L 67/06; H04L 12/40097;
H04L 12/40091; H04N 21/2146; H04N
21/42684; H04N 21/64322; H05B 45/20;
H05B 47/18; H05B 45/28
See application file for complete search history.

(56) References Cited

U.S. PATENT DOCUMENTS

| | | | | |
|---|---|---|---|---|
| 9,031,716 | B2* | 5/2015 | Myers | H04L 67/12 |
| | | | | 701/3 |
| 9,980,298 | B2* | 5/2018 | Batsakes | G06F 3/01 |
| 10,960,985 | B2 | 3/2021 | Johnson et al. | |
| 2003/0003872 | A1* | 1/2003 | Brinkley | H04L 67/34 |
| | | | | 455/66.1 |
| 2005/0027826 | A1* | 2/2005 | Loda | H04L 67/025 |
| | | | | 709/219 |
| 2006/0174285 | A1* | 8/2006 | Brady | H04N 21/2146 |
| | | | | 725/78 |
| 2007/0115938 | A1* | 5/2007 | Conzachi | B64F 5/60 |
| | | | | 370/352 |
| 2007/0127460 | A1* | 6/2007 | Wilber | H04L 49/602 |
| | | | | 370/389 |
| 2007/0129854 | A1* | 6/2007 | Sandell | G08G 5/0013 |
| | | | | 701/16 |
| 2009/0192659 | A1* | 7/2009 | Beebe | G07C 5/008 |
| | | | | 701/2 |
| 2010/0287545 | A1* | 11/2010 | Corbefin | G06F 21/572 |
| | | | | 717/174 |
| 2011/0102198 | A1* | 5/2011 | Deleris | G06F 3/1438 |
| | | | | 340/971 |
| 2015/0120097 | A1* | 4/2015 | Hathaway | B64D 47/08 |
| | | | | 701/14 |
| 2015/0161618 | A1* | 6/2015 | Angus | G06F 8/60 |
| | | | | 705/317 |
| 2016/0352412 | A1* | 12/2016 | Di Costanzo | H04N 21/2146 |
| 2017/0241798 | A1* | 8/2017 | Van Den Bergh | B64F 5/60 |
| 2017/0289309 | A1* | 10/2017 | Judd | H04L 67/34 |
| 2018/0242390 | A1* | 8/2018 | Batsakes | G06Q 50/30 |
| 2019/0324455 | A1* | 10/2019 | Devaureix | G06F 9/30029 |
| 2020/0130860 | A1 | 4/2020 | Johnson | G09G 5/14 |
| 2020/0396602 | A1* | 12/2020 | Avila | H04W 12/088 |
| 2020/0402412 | A1* | 12/2020 | Shamasundar | G08G 5/0021 |
| 2021/0374101 | A1* | 12/2021 | Briand | G06F 16/178 |
| 2022/0135243 | A1* | 5/2022 | Arnold | B64D 43/00 |
| | | | | 701/3 |
| 2023/0021088 | A1* | 1/2023 | V | G06F 3/04842 |

* cited by examiner

AIRCRAFT INFORMATION SYSTEMS, AIRCRAFT THAT INCLUDE THE SYSTEMS, METHODS OF UTILIZING THE SYSTEMS, AND METHODS OF CONFIGURING THE SYSTEMS

FIELD

The present disclosure relates generally to aircraft information systems, to aircraft that include the systems, to methods of utilizing the systems, and/or to methods of configuring the systems.

BACKGROUND

Fixed electronic interfaces may be utilized, by various crew of an aircraft and/or by maintenance personnel, to electronically access specific functionality. As an example, a flight deck crew may utilize a fixed flight deck electronic interface to access flight deck functionality. As another example, a cabin attendant may utilize a fixed cabin electronic interface to access cabin functionality. As yet another example, a mechanic may utilize a fixed mechanic electronic interface to access mechanic and/or repair functionality. While effective, these fixed interfaces also are quite limiting, as they require various individuals to be in specific locations, on the aircraft, in order to access a given functionality. In addition, functionality often is not shared across fixed electronic interfaces. As an example, it may not be possible to access flight deck functionality from the fixed cabin electronic interface and/or from the fixed mechanic electronic interface. Furthermore, it is common for different aircraft models to utilize entirely different fixed electronic interface locations and/or to present and/or access a given functionality in different ways. This may increase software development costs, as well as training costs associated with ensuring that an individual is qualified to access and/or utilize a given functionality across a variety of different aircraft models. Thus, there exists a need for improved aircraft information systems, for aircraft that include the improved aircraft information systems, for methods of utilizing the improved aircraft information systems, and/or for methods of configuring the improved aircraft information systems.

SUMMARY

Aircraft information systems, aircraft that include the aircraft information systems, methods of utilizing the aircraft information systems, and methods of configuring the aircraft information systems are disclosed herein. The aircraft information systems include a fixed computing device configured to be fixedly installed within an aircraft. The fixed computing device is programmed to provide a cabin function interface that provides cabin functionality for a cabin attendant of the aircraft and also to provide a mechanic function interface that provides mechanic functionality for a mechanic for the aircraft. The aircraft include a fuselage, at least one wing, at least one engine, and the aircraft information systems.

The methods of utilizing include wirelessly connecting, with a portable computing device, to a fixed computing device that is programmed to provide a cabin function interface that provides cabin functionality for a cabin attendant of an aircraft and a mechanic function interface that provides mechanic functionality for a mechanic for the aircraft. The methods of utilizing also include accessing at least one of the cabin function interface and the mechanic function interface via the portable computing device.

The methods of configuring include determining an identity of an aircraft. The methods of configuring also include applying, with a fixed computing device of an aircraft information system and from a plurality of configuration files, a predetermined configuration file, which directs communication between the fixed computing device and the aircraft.

DESCRIPTION

Figure 1:
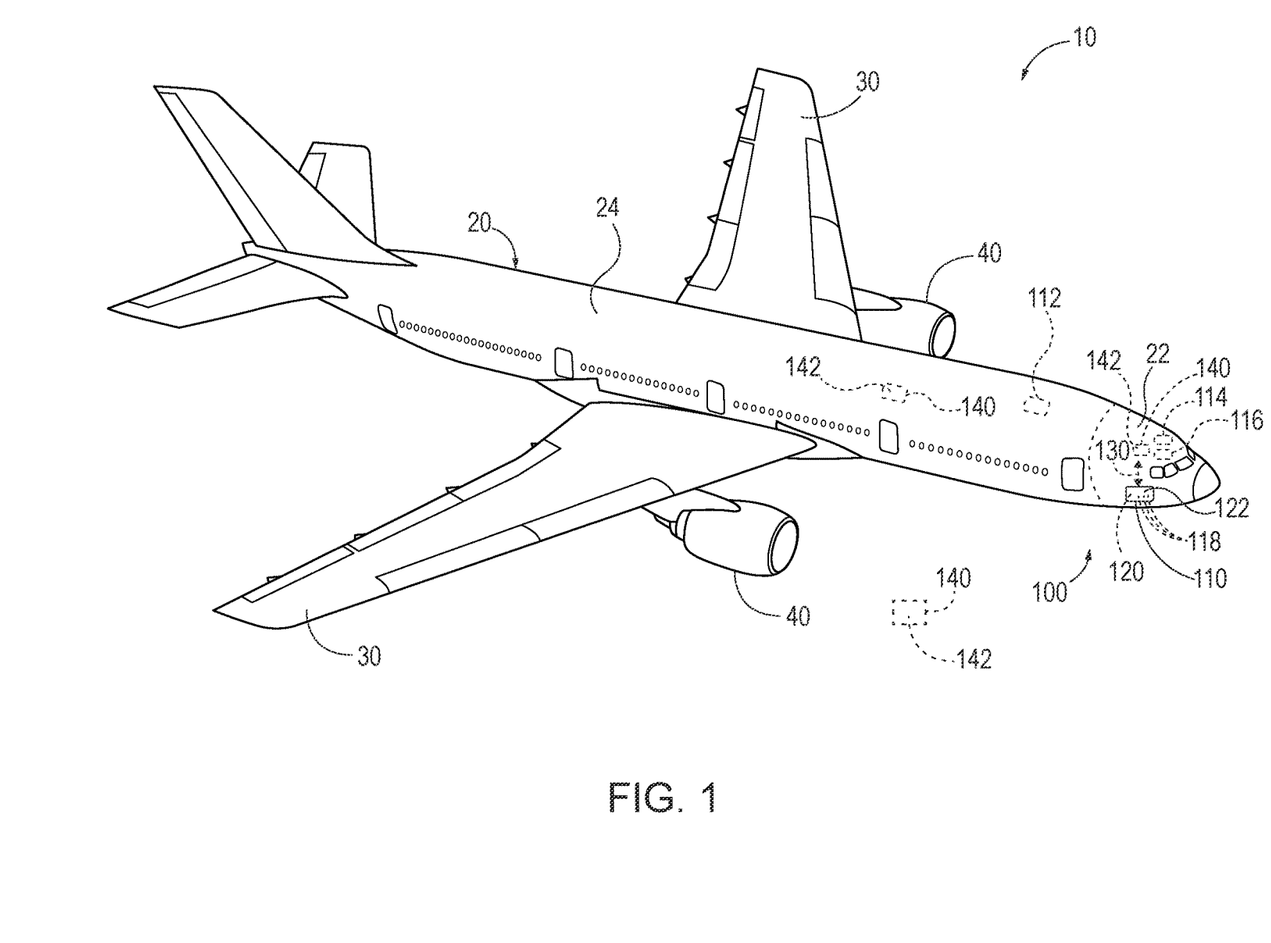
FIG. 1 is a schematic illustration of examples of an aircraft information system that may be included in an aircraft, according to the present disclosure.
Figure 2:
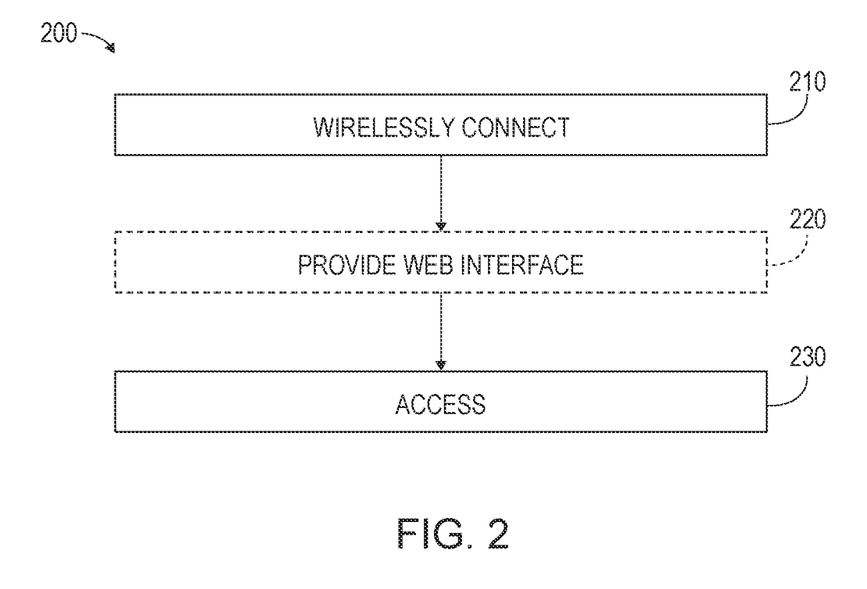
FIG. 2 is a flowchart depicting examples of methods of utilizing an aircraft information system, according to the present disclosure.
Figure 3:
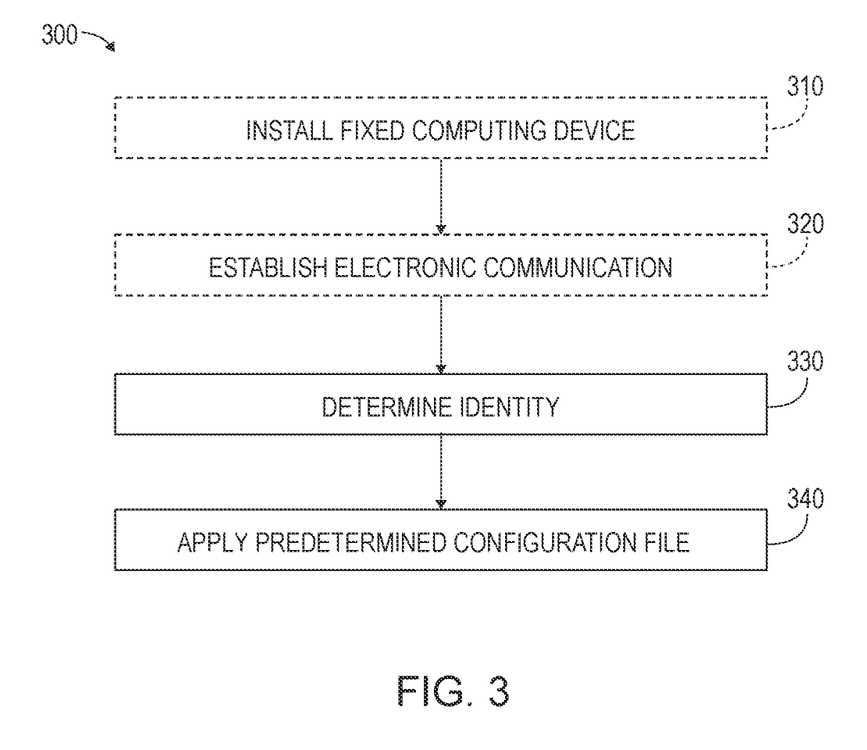
FIG. 3 is a flowchart depicting examples of methods of configuring an aircraft information system, according to the present disclosure.

FIGS. 1-3 provide illustrative, non-exclusive examples of aircraft information systems 100, of aircraft 10 that include aircraft information systems 100, of methods 200, and/or of methods 300 according to the present disclosure. All elements may not be labeled in each of FIGS. 1-3, but reference numerals associated therewith may be utilized herein for consistency. Elements, components, and/or features that are discussed herein with reference to one or more of FIGS. 1-3 may be included in and/or utilized with any of FIGS. 1-3 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

FIG. 1 is a schematic illustration of examples of an aircraft information system 100 that may be included in an aircraft 10, according to the present disclosure. Aircraft information systems 100, which also may be referred to herein as systems 100, include a fixed computing device 110, which is configured to be fixedly installed within and/or mounted to aircraft 10. Fixed computing device 110 is programmed to provide a cabin function interface, which provides cabin functionality to, or such as may be utilized by, a cabin attendant of aircraft 10. In addition, fixed computing device 110 also is configured to provide a mechanic function interface, which provides mechanic functionality to, or such as may be utilized by, a mechanic of aircraft 10.

In contrast with conventional fixed electronic interfaces within aircraft, which may be configured to provide conventional cabin functionality via a conventional cabin function interface or to provide conventional mechanic functionality via a conventional mechanic function interface, fixed computing devices 110, according to the present disclosure, may include and/or be a single fixed computing device, such as may be housed in a single enclosure, may include a single motherboard, and/or may include a single central processing unit (CPU), that may provide both the cabin function interface and the mechanic function interface. Stated differently, the single fixed computing device may be configured such that the same CPU processes information regarding both the cabin function interface and the mechanic function interface, such that the same random access memory module stores information regarding both the cabin function interface and the mechanic function interface, such that the same motherboard conveys information regarding both the cabin function interface and the mechanic function interface, and/or such that the same computer-readable storage media includes instructions regarding both the cabin function interface and the mechanic function interface.

Computer-readable storage media 120, when present, also may be referred to herein as non-transitory computer-readable storage media 120. This non-transitory computer-readable storage media may include, define, house, and/or store computer-executable instructions, programs, and/or code; and these computer-executable instructions may direct aircraft information system 100 and/or fixed computing device 110 thereof to perform any suitable portion, or subset, of methods 200 and/or methods 300, which are discussed in more detail herein. Examples of such non-transitory computer-readable storage media include CD-ROMs, disks, hard drives, flash memory, etc. As used herein, storage, or memory, devices and/or media having computer-executable instructions, as well as computer-implemented methods and other methods according to the present disclosure, are considered to be within the scope of subject matter deemed patentable in accordance with Section 101 of Title 35 of the United States Code.

In some examples, fixed computing device 110 may provide a standardized interface for both the cabin function interface and the mechanic function interface. Stated differently, a visual construction of, a menu hierarchy within, and/or an aesthetic of the cabin function interface and the mechanic function interface may be standardized, may be similar, and/or, in some examples, may be identical.

The cabin function interface may provide any suitable cabin functionality, such as may be utilized by the cabin attendant of aircraft 10 and/or may be accessed from a cabin 24 of aircraft 10. As an example, the cabin functionality may permit the cabin attendant to communicate with a flight deck of aircraft 10. As another example, the cabin functionality may permit the cabin attendant to communicate with passengers on aircraft 10. As yet another example, the cabin functionality may permit the cabin attendant to control media displayed to passengers on aircraft 10.

The mechanic function interface may provide any suitable mechanic functionality, such as may be utilized by the mechanic of aircraft 10. As an example, the mechanic functionality may permit the mechanic to monitor aircraft systems diagnostics. As another example, the mechanic functionality may permit the mechanic to modify aircraft systems control parameters. As yet another example, the mechanic functionality may permit the mechanic to troubleshoot aircraft system faults. As yet another example, the mechanic functionality may permit the mechanic to repair aircraft system faults.

In some examples, fixed computing device 110 also may include a flight deck function interface. The flight deck function interface, when present, may provide flight deck functionality for, or such as may be utilized by, a flight crew of aircraft 10. In some such examples, the flight deck functionality may include avionics software for aircraft 10. In some such examples, the flight deck functionality provides the flight crew of aircraft 10 with in-flight control of aircraft 10. In some such examples, fixed computing device 110 is the single fixed computing device and may provide the cabin function interface, the mechanic function interface, and the flight deck function interface.

In some examples, fixed computing device 110 may be configured for installation in and/or for communication with a variety of different, or different models of, aircraft 10. This may include installations and/or communications that permit and/or facilitate the cabin function interface and the mechanic function interface, as well as the flight deck function interface, when present. With this in mind, fixed computing device 110 may include a plurality of configuration files 118, and each configuration file 118 in the plurality of configuration files 118 may be utilized to facilitate installation of fixed computing device 110 in and/or communication of fixed computing device 110 with a different, or a corresponding, aircraft and/or aircraft model.

Fixed computing device 110 may be programmed to utilize a predetermined configuration file 118 of the plurality of configuration files 118, and the predetermined configuration file 118 may direct communication between fixed computing device 110 and aircraft 10. Stated differently, each configuration file 118 of the plurality of configuration files 118 may configure fixed computing device 110 for operation within, for at least partial control of, and/or for electronic communication with a corresponding aircraft model of a plurality of distinct aircraft models. Stated still differently, a given configuration file 118 of the plurality of configuration files 118 may configure fixed computing device 110 for operation within, for at least partial control of, and/or for electronic communication with a corresponding aircraft model of the plurality of distinct aircraft models and may be incapable of configuring fixed computing device 110 for operation with, for at least partial control of, and/or for electronic communication with at least one other, or even every other, aircraft model of the plurality of distinct aircraft models.

In some examples, fixed computing device 110 may be programmed to identify the aircraft within which it is installed. As an example, fixed computing device 110 may utilize a communication linkage 130 to electronically communicate with at least one other component of aircraft 10 and/or to identify aircraft 10 based, at least in part, on this communication. In some such examples, fixed computing device 110 further may be programmed to select the predetermined configuration file based, at least in part, on an identity of aircraft 10, such as may be determined from the communication with aircraft 10.

As used herein, the phrase "aircraft model" refers to product identifiers and/or model numbers for commercially available aircraft. Examples of aircraft models that are produced, manufactured, and/or distributed by Boeing include the 707, 717, 720, 727, 737, 747, 767, 777, and/or 787. Examples of aircraft models that are produced, manufactured, and/or distributed by Airbus include the A220, A300, A310, A318, A319, A320, A321, A330, A340, A350, and/or A380. With the above in mind, the phrase "the plurality of distinct aircraft models" may refer, in some examples, to a subset, or even all, of the above-referenced Boeing and/or Airbus aircraft, as well as to aircraft models that are produced, manufactured, and/or distributed by other aircraft manufacturers, prior Boeing and/or Airbus aircraft that are not included in the above lists, and/or future aircraft models, from any manufacturer, that are not included in the above lists.

As discussed, conventional fixed electronic interfaces are specific to a given aircraft model, such as, for example, a Boeing 777. In contrast with aircraft information systems 100 and/or fixed computing devices 110, according to the present disclosure, these conventional fixed electronic interfaces are incapable of being configured for operation with, for at least partial control of, and/or for electronic communication with a plurality of distinct aircraft models. As such, aircraft information systems 100 and/or fixed computing devices 110, according to the present disclosure, may provide distinct advantages over conventional fixed electronic interfaces. As an example, a single aircraft information system 100 may be developed for and/or utilized within the plurality of distinct aircraft models, thereby decreasing software development costs. As another example, the cabin function interface, the mechanic function interface, and/or the flight deck function interface provided by aircraft information systems 100 and/or fixed computing devices 110, according to the present disclosure, may be similar, or identical, across the plurality of distinct aircraft models, thereby decreasing training requirements.

In some examples, aircraft information systems 100 also include a fixed device wireless interface 122. Fixed device wireless interface 122, when present, may be adapted, configured, designed, constructed, and/or programmed to permit and/or facilitate wireless connectivity, or wireless communication, for fixed computing device 110. In some such examples, aircraft information systems 100 also include at least one portable computing device 140. Portable computing device 140 may include a portable device wireless interface 142, and portable device wireless interface 142 may be configured to provide access to the cabin function interface, the mechanic function interface, and/or the flight deck function interface. This access may be via wireless communication facilitated by fixed device wireless interface 122 and portable device wireless interface 142.

Examples of portable computing device 140 include a handheld computing device, a tablet, a laptop computer, a cellular phone, a smart phone, a cabin mobile device configured to be utilized by the cabin attendant, a flight deck mobile device configured to be utilized by the flight crew of aircraft 10, and/or a mechanic mobile device configured to be utilized by the mechanic. Examples of fixed device wireless interface 122 include a fixed device short range wireless interface, a fixed device Bluetooth interface, an encrypted fixed device Bluetooth interface, a fixed device Wi-Fi interface; and/or an encrypted fixed device Wi-Fi interface. Examples of portable device wireless interface 142 include a portable device short range wireless interface, a portable device Bluetooth interface, an encrypted portable device Bluetooth interface, a portable device Wi-Fi interface, and/or an encrypted portable device Wi-Fi interface.

In some examples, aircraft information systems 100 also may include a forward display 116. Forward display 116, when present, may be positioned within a flight deck 22 of aircraft 10; and portable computing device 140 may be adapted, configured, designed, constructed, and/or programmed to control, or to at least temporarily control, information, or at least a subset of information, displayed on forward display 116.

In some examples, fixed computing device 110 may be programmed to provide the cabin function interface, the mechanic function interface, and/or the flight deck function interface via a web browser interface. Stated differently, portable computing device 140 and fixed computing device 110 may communicate utilizing the web browser interface and/or a user of portable computing device 140 may interact with fixed computing device 110, via portable computing device 140, utilizing the web browser interface.

In some examples, aircraft information systems 100 may be configured to permit the cabin attendant to communicate with fixed computing device 110, via portable computing device 140, while aircraft 10 is in flight and/or from cabin 24. Such a configuration may permit and/or facilitate performance of cabin duties, which utilize the cabin function interface, while aircraft 10 is in flight, from cabin 24, and/or without the need for the cabin attendant to utilize fixed cabin attendant panel 112, when present. Stated differently, aircraft information systems 100 may permit the cabin attendant to access the cabin function interface from any location within cabin 24, thereby providing increased flexibility for the cabin attendant when compared to conventional aircraft that may include a conventional fixed cabin attendant panel but that do not include aircraft information systems 100, according to the present disclosure.

In some examples, aircraft information systems 100 may be configured to permit the mechanic to communicate with fixed computing device 110, via portable computing device 140, during repair and/or maintenance of aircraft 10. Such a configuration may provide the mechanic with increased flexibility when compared to conventional aircraft that may include a conventional fixed maintenance terminal but that do not include aircraft information systems 100, according to the present disclosure.

In some examples, aircraft information systems 100 may be configured such that portable computing device 140 may provide access to the cabin function interface, the mechanic function interface, and/or the flight deck function interface from a variety of locations, which may be spaced apart from corresponding fixed cabin attendant panels 112, fixed maintenance terminals 114, and/or forward displays 116, when present. As examples, aircraft information systems 100 may be configured to permit portable computing device 140 to access to the cabin function interface, the mechanic function interface, and/or the flight deck function interface from flight deck 22, from cabin 24, and/or from external of aircraft 10. Such configurations may provide further flexibility for access to functionality of aircraft information systems 100 when compared to conventional aircraft that do not include aircraft information systems 100, according to the present disclosure.

As discussed, aircraft information system 100 may be incorporated within, may be installed within, may form a portion of, and/or may electronically communicate with aircraft 10. In addition to aircraft information system 100, aircraft 10 may include any suitable conventional aircraft component and/or components. As an example, aircraft 10 may include a fuselage 20, which may include, house, and/or contain flight deck 22 and cabin 24. As discussed, the cabin function interface may be configured to be utilized by the cabin crew of aircraft 10 and generally may be accessed from cabin 24. Similarly, the flight deck function interface may be configured to be utilized by the flight crew of aircraft 10 and generally may be accessed from flight deck 22.

As another example, aircraft 10 may include at least one wing 30. In the example of FIG. 1, wing 30 is operatively attached to fuselage 20. As another example, aircraft 10 may include at least one engine 40. In the example of FIG. 1, engines 40 are operatively attached to wings 30 and/or are operatively attached to fuselage 20 via wings 30.

In some examples, aircraft 10 also may include fixed cabin attendant panel 112, which may be positioned within cabin 24 and/or may be configured to provide access to the cabin function interface. Additionally or alternatively, aircraft 10 may include fixed maintenance terminal 114, which may be configured to provide access to the mechanic function interface. Additionally or alternatively, aircraft 10 may include forward display 116, which may be positioned within flight deck 22 and/or may be configured to provide access to the flight deck function interface. Fixed cabin attendant panel 112, fixed maintenance terminal 114, and/or forward display 116 may be fixedly mounted to aircraft 10 and/or may be configured to communicate with fixed computing device 110 via a wired interface, such as via communication linkage 130.

FIG. 2 is a flowchart depicting examples of methods 200 of utilizing an aircraft information system, such as aircraft information system 100, as disclosed herein. Methods 200 include wirelessly connecting at 210 and may include providing a web interface at 220. Methods 200 also include accessing at 230.

The wirelessly connecting at 210 may include wirelessly connecting, with a portable computing device, to a fixed computing device. The fixed computing device is programmed to provide a cabin function interface, which provides cabin functionality for a cabin attendant of an aircraft. The fixed computing device is also programmed to provide a mechanic function interface, which provides mechanic functionality for a mechanic of the aircraft. Examples of the portable computing device are disclosed herein with reference to portable computing device 140. Examples of the fixed computing device are disclosed herein with reference to fixed computing device 110. Examples of the cabin function interface, the cabin functionality, the mechanic function interface, and the mechanic functionality are disclosed herein.

In some examples, the wirelessly connecting at 210 may include wirelessly connecting from external the aircraft and/or while the portable computing device is external the aircraft. In some examples, the wirelessly connecting at 210 may include wirelessly connecting from a cabin of the aircraft and/or while the portable computing device is within the cabin of the aircraft. In some examples, the wirelessly connecting at 210 may include wirelessly connecting from a flight deck of the aircraft and/or while the portable computing devise is within the flight deck of the aircraft. In some examples, the wirelessly connecting at 210 may include wirelessly connecting during flight of the aircraft. In some examples, the wirelessly connecting at 210 may include wirelessly connecting during maintenance and/or repair of the aircraft.

In some examples, the fixed computing device further may be programmed to provide a flight deck function interface, which provides flight deck functionality for a flight crew of the aircraft. Examples of the flight deck interface and of the flight deck functionality are disclosed herein.

The providing the web interface at 220 may include providing the web interface with, via, and/or utilizing the fixed computing device. The web interface may include a web browser interface, which may be provided to the portable computing device and/or by the fixed computing device. When methods 200 include the providing at 220, the accessing at 230 may include accessing with, via, and/or utilizing the web browser interface.

The accessing at 230 includes accessing the cabin function interface, the mechanic function interface, and/or the flight deck function interface, when present, on the fixed computing device, utilizing the portable computing device, and/or via the portable computing device.

In some examples, the accessing at 230 may include accessing from external the aircraft and/or while the portable computing device is external the aircraft. In some examples, the accessing at 230 may include accessing from the cabin of the aircraft and/or while the portable computing device is within the cabin of the aircraft. In some examples, the accessing at 230 may include accessing from a flight deck of the aircraft and/or while the portable computing devise is within the flight deck of the aircraft. In some examples, the accessing at 230 may include accessing during flight of the aircraft. In some examples, the accessing at 230 may include accessing during maintenance and/or repair of the aircraft.

FIG. 3 is a flowchart depicting examples of methods 300 of configuring an aircraft information system for operation within an aircraft, according to the present disclosure. The aircraft information system includes a fixed computing device. Examples of the aircraft are disclosed herein with reference to aircraft 10. Examples of the aircraft information system are disclosed herein with reference to aircraft information system 100. Examples of the fixed computing device are disclosed herein with reference to fixed computing device 110. Methods 300 may include installing a fixed computing device at 310 and/or establishing electronic communication at 320. Methods 300 include determining an identity at 330 and applying a predetermined configuration file at 340.

The installing the fixed computing device at 310, when performed, may include installing the fixed computing device within the aircraft. This may include fixedly mounting the fixed computing device at a predetermined, established, and/or desired location within the aircraft.

The establishing electronic communication at 320 may include establishing and/or enabling electronic communication between the fixed computing device and the aircraft. This may include permitting and/or facilitating electric power and/or data transfer between the fixed computing device and the aircraft. In some examples, the establishing at 320 may include utilizing a communication linkage, examples of which are disclosed herein with reference to communication linkage 130.

The determining the identity at 330 may include determining the identity of the aircraft. This may include determining a make, a model, and/or a serial number of the aircraft. Examples of the model of the aircraft are disclosed herein.

In some examples, the determining at 330 may include receiving an identity input, such as from an operator of the aircraft information system. In some examples, and when methods 300 include the establishing at 320, the determining at 330 may include electronically determining the identity of the aircraft based, at least in part, on the electronic communication and/or utilizing the communication linkage.

The applying the predetermined configuration file at 340 may include selecting, with the fixed computing device and/or from a plurality of configuration files, the predetermined configuration file. The predetermined configuration file directs, is configured to direct, facilitates, is configured to facilitate, enables, and/or is configured to enable communication between the fixed computing device and the aircraft. Stated differently, the predetermined configuration file may provide standards and/or protocols that may permit the fixed computing device to communicate with the aircraft, such as to permit the fixed computing device to control, to regulate, and/or to access flight deck functionality, cabin functionality, and/or mechanic functionality of the aircraft, to control the operation of at last portions of the aircraft, and/or to receive information from at least portions of the aircraft. Examples of the plurality of configuration files and of the predetermined configuration file are disclosed herein with reference to configuration file 118.

In some examples, the applying at 340 may be based, at least in part, on the determining at 330. Stated differently, the fixed computing device may utilize the identity of the aircraft, as determined during the determining at 330, to select and/or to apply a configuration file, from the plurality of configuration files, that is appropriate to the identity of the aircraft and/or that permits the fixed computing device to communicate with the aircraft. In some examples, the applying at 340 may include utilizing the predetermined configuration file to facilitate communication between the fixed computing device and the aircraft.

In some examples, each configuration file 118 in the plurality of configuration files 118 configures the fixed computing device 110 for operation within a corresponding aircraft model of a plurality of distinct aircraft models. In some such examples, each configuration file 118 in the plurality of configuration files 118 includes a plurality of common functions, which are common to all aircraft models of the plurality of distinct aircraft models. In some such examples, each configuration file provides a user interface, which is independent of the aircraft model, for each common function of the plurality of common functions. By providing an user interface that is common to all aircraft models and/or is independent of the aircraft model, the aircraft information system 100 according to the present disclosure may provide commonality among the plurality of distinct aircraft models, may decrease software development costs for the plurality of distinct aircraft models, and/or may decrease training requirements needed to train users of the aircraft information system 100 within two or more of the plurality of distinct aircraft models.

In some examples, at least a subset, or even each, configuration file 118 of the plurality of configuration files 118 includes at least one unique function, which is unique to a given aircraft model of the plurality of distinct aircraft models. In some such examples, the aircraft information system 100 provides a unique user interface, which is dependent on the given aircraft model, for the at least one unique function. By permitting individual aircraft models to have unique functions, which may not be present for all aircraft models, aircraft information systems 100 according to the present disclosure may be broadly applicable to and/or compatible with a wide variety of different aircraft models. This may permit and/or facilitate utilization of a single fixed computing device 110, together with a corresponding configuration file 118, within the wide variety of different aircraft models, thereby decreasing software development costs for the variety of different aircraft models.

Illustrative, non-exclusive examples of inventive subject matter according to the present disclosure are described in the following enumerated paragraphs:

A1. An aircraft information system (100), comprising:
a fixed computing device (110) configured to be fixedly installed within an aircraft (10), wherein the fixed computing device (110) is programmed to provide a cabin function interface that provides cabin functionality for a cabin attendant of the aircraft (10) and a mechanic function interface that provides mechanic functionality for a mechanic for the aircraft (10).

A2. The system (100) of paragraph A1, wherein the fixed computing device (110) includes a plurality of configuration files (118) and is programmed to utilize a predetermined configuration file (118) of the plurality of configuration files (118), wherein the predetermined configuration file (118) directs communication between the fixed computing device (110) and the aircraft (10).

A3. The system (100) of paragraph A2, wherein each configuration file (118) of the plurality of configuration files (118) configures the fixed computing device (110) for operation within a corresponding aircraft model of a plurality of distinct aircraft models.

A4. The system (100) of any of paragraphs A2-A3, wherein the fixed computing device (110) is programmed to identify the aircraft (10) and to select the predetermined configuration file (118) based, at least in part, on an identity of the aircraft (10).

A5. The system (100) of any of paragraphs A1-A4, wherein the system (100) further includes:
a fixed device wireless interface (122) configured to provide wireless connectivity for the fixed computing device (110); and
at least one portable computing device (140) that includes a portable device wireless interface (142) configured to provide access to at least one of the cabin function interface and the mechanic function interface of the fixed computing device (110).

A6. The system (100) of paragraph A5, wherein the at least one portable computing device (140) includes at least one of:
(i) a handheld computing device;
(ii) a tablet;
(iii) a laptop computer;
(iv) a cellular phone;
(v) a smart phone;
(vi) a cabin mobile device configured to be utilized by the cabin attendant;
(vii) a flight deck mobile device configured to be utilized by a flight crew of the aircraft (10); and
(viii) a mechanic mobile device configured to be utilized by the mechanic.

A7. The system (100) of any of paragraphs A5-A6, wherein the system (100) further includes a forward display (116) positioned within a flight deck (22) of the aircraft (10), and further wherein the at least one portable computing device (140) is configured to control information displayed on the forward display (116).

A8. The system (100) of any of paragraphs A5-A7, wherein the fixed computing device (110) is programmed to provide both the cabin function interface and the mechanic function interface within a web browser interface.

A9. The system (100) of any of paragraphs A5-A8, wherein the fixed device wireless interface (122) includes at least one of:
(i) a fixed device short range wireless interface;
(ii) a fixed device Bluetooth interface;
(iii) an encrypted fixed device Bluetooth interface;
(iv) a fixed device Wi-Fi interface; and
(v) an encrypted fixed device Wi-Fi interface.

A10. The system (100) of any of paragraphs A5-A9, wherein the portable device wireless interface (142) includes at least one of:
(i) a portable device short range wireless interface;
(ii) a portable device Bluetooth interface;
(iii) an encrypted portable device Bluetooth interface;
(iv) a portable device Wi-Fi interface; and
(v) an encrypted portable device Wi-Fi interface.

A11. The system (100) of any of paragraphs A5-A10, wherein the aircraft information system (100) is configured to permit the cabin attendant to communicate with the fixed computing device (110), via the at least one portable computing device (140), while the aircraft (10) is in flight.

A12. The system (100) of any of paragraphs A5-A11, wherein the aircraft information system (100) is configured to permit the mechanic to communicate with the fixed computing device (110), via the at least one portable computing device (140), at least one of during repair of the aircraft (10) and during maintenance of the aircraft (10).

A13. The system (100) of any of paragraphs A5-A12, wherein the at least one portable computing device (140) is configured to provide access to at least one of the cabin function interface and the mechanic function interface from a cabin (24) of the aircraft (10).

A14. The system (100) of any of paragraphs A5-A13, wherein the at least one portable computing device (140) is configured to provide access to at least one of the cabin function interface and the mechanic function interface from a/the flight deck (22) of the aircraft (10).

A15. The system (100) of any of paragraphs A5-A14, wherein the at least one portable computing device (140) is configured to provide access to at least one of the cabin function interface and the mechanic function interface from external the aircraft (10).

A16. The system (100) of any of paragraphs A1-A15, wherein the fixed computing device (110) is a single fixed computing device.

A17. The system (100) of any of paragraphs A1-A16, wherein the fixed computing device (110) provides a standardized interface for both the cabin function interface and the mechanic function interface.

A18. The system (100) of any of paragraphs A1-A17, wherein the fixed computing device (110) further includes a flight deck function interface that provides flight deck functionality for a/the flight crew of the aircraft (10).

A19. The system (100) of paragraph A18, wherein the flight deck functionality includes avionics software for the aircraft (10).

A20. The system (100) of any of paragraphs A18-A19, wherein the flight deck functionality provides the flight crew of the aircraft (10) with in-flight control of the aircraft (10).

A21. The system (100) of any of paragraphs A1-A20, wherein the cabin functionality at least one of:
(i) permits the cabin attendant to communicate with a/the flight deck (22) of the aircraft (10);
(ii) permits the cabin attendant to communicate with passengers on the aircraft (10); and
(iii) permits the cabin attendant to control media displayed to the passengers on the aircraft (10).

A22. The system (100) of any of paragraphs A1-A21, wherein the mechanic functionality at least one of:
(i) permits the mechanic to monitor aircraft systems diagnostics;
(ii) permits the mechanic to modify aircraft systems control parameters;
(iii) permits the mechanic to troubleshoot aircraft system faults; and
(iv) permits the mechanic to repair aircraft system faults.

B1. An aircraft (10) comprising:
the aircraft information system (100) of any of paragraphs A1-A22;
a fuselage (20) that includes a/the flight deck (22) and a/the cabin (24);
at least one wing (30); and
at least one engine (40).

B2. The aircraft (10) of paragraph B1, wherein the aircraft (10) further includes a fixed cabin attendant panel (112), which is positioned within the cabin (24) and configured to provide access to the cabin function interface.

B3. The aircraft (10) of any of paragraphs B1-B2, wherein the aircraft (10) further includes a fixed maintenance terminal (114) configured to provide access to the mechanic function interface.

C1. A method (200) of utilizing an aircraft information system (100), the method (200) comprising:
wirelessly connecting (210), with a portable computing device (140), to a fixed computing device (110) that is programmed to provide a cabin function interface that provides cabin functionality for a cabin attendant of an aircraft (10) and a mechanic function interface that provides mechanic functionality for a mechanic for the aircraft (10); and
accessing (230) at least one of the cabin function interface and the mechanic function interface via the portable computing device (140).

C2. The method (200) of paragraph C1, wherein the wirelessly connecting (210) includes wirelessly connecting while the portable computing device (140) is external the aircraft (10).

C3. The method (200) of any of paragraphs C1-C2, wherein the wirelessly connecting (230) includes wirelessly connecting from a cabin (24) of the aircraft (10).

C4. The method (200) of any of paragraphs C1-C3, wherein the method (200) includes performing the wirelessly connecting (210) and the accessing (230) during flight of the aircraft (10).

C5. The method (200) of any of paragraphs C1-C4, wherein the method (200) includes performing the wirelessly connecting (210) and the accessing (230) during at least one of maintenance of the aircraft (10) and repair of the aircraft (10).

C6. The method (200) of any of paragraphs C1-05, wherein the method (200) further includes providing (220), with the fixed computing device (110), a web browser interface to the portable computing device (140), and further wherein the accessing (230) includes accessing via the web browser interface.

C7. The method of ay of paragraphs C1-C6, wherein the aircraft information system (100) includes any suitable structure and/or function of any of the aircraft information systems (100) of any of paragraphs A1-A22 or any of the aircraft (10) of any of paragraphs B1-B3.

D1. A method (300) of configuring an aircraft information system (100), which includes a fixed computing device (110), for operation within an aircraft (10), the method (300) comprising:
determining (330) an identity of the aircraft (10); and
applying (340), with the fixed computing device (110) of the aircraft information system (100) and from a plurality of configuration files (118), a predetermined configuration file (118), wherein the predetermined configuration file (118) directs communication between the fixed computing device (140) and the aircraft (10).

D2. The method (300) of paragraph D1, wherein each configuration file (118) in the plurality of configuration files (118) configures the fixed computing device (110) for operation within a corresponding aircraft model of a plurality of distinct aircraft models.

D3. The method (300) of paragraph D2, wherein each configuration file (118) in the plurality of configuration files (118) includes a plurality of common functions, which are common to all aircraft models of the plurality of distinct aircraft models.

D4. The method (300) of paragraph D3, wherein the aircraft information system (100) provides a single user interface, which is independent of aircraft model, for each common function of the plurality of common functions.

D5. The method (300) of any of paragraphs D2-D4, wherein each configuration file (118) includes at least one unique function, which is unique to a given aircraft model.

D6. The method (300) of paragraph D5, wherein the aircraft information system (100) provides a unique user interface, which is dependent on the given aircraft model, for the at least one unique function.

D7. The method (300) of any of paragraphs D1-D6, wherein the determining (330) the identity of the aircraft (10) includes receiving an identity input from an operator of the aircraft information system (100).

D8. The method (300) of any of paragraphs D1-D7, wherein the determining (330) the identity of the aircraft (10) includes establishing (320) electronic communication between the aircraft (10) and the aircraft information system (100) and electronically determining the identity of the aircraft (10) based, at least in part, on the electronic communication.

D9. The method (300) of any of paragraphs D1-D8, wherein the method (300) further includes installing (310) the fixed computing device (110) within the aircraft (10).

D10. The method (300) of paragraph D9, wherein the installing (310) includes enabling electronic communication between the fixed computing device (110) and the aircraft (10).

D11. The method (300) of any of paragraphs D1-D10, wherein the aircraft information system (100) includes any suitable structure and/or function of any of the aircraft information systems (100) of any of paragraphs A1-A22 or any of the aircraft (10) of any of paragraphs B1-B3.

E1. Non-transitory computer-readable storage media (120) including computer-readable instructions that, when executed, direct an aircraft information system (100) to perform any suitable portion of any of the methods (200, 300) of any of paragraphs C1-D11.

F1. The use of a single aircraft information system (100) within a plurality of distinct aircraft models.

F2. The use of an aircraft information system (100) to permit wireless access to at least one of a cabin function interface and a mechanic function interface, which are stored on a fixed computing device (110), via a portable computing device (140).

F3. The use of a portable computing device (140) to access an aircraft information system (100) of an aircraft (10) from a cabin (24) of the aircraft (10) and during flight of the aircraft (10).

F4. The use of a portable computing device (140) to access an aircraft information system (100) of an aircraft (10) from external the aircraft (10).

F5. The use of any of the aircraft information systems (100) of any of paragraphs A1-A22 or any of the aircraft (10) of any of paragraphs B1-B3 with any of the methods (200, 300) of any of paragraphs C1-D11.

F6. The use of any of the methods (200, 300) of any of paragraphs C1-D11 with any of the aircraft information systems (100) of any of paragraphs A1-A22 or any of the aircraft (10) of any of paragraphs B1-B3.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. An aircraft information system, comprising:
   a fixed computing device configured to be fixedly installed within an aircraft;
   wherein the fixed computing device is programmed to provide a cabin function interface that provides cabin functionality for a cabin attendant of the aircraft, a mechanic function interface that provides mechanic functionality for a mechanic for the aircraft, and a flight deck function interface that provides flight deck functionality for a flight crew of the aircraft;
   wherein the fixed computing device includes a plurality of configuration files and is programmed to utilize a predetermined configuration file of the plurality of configuration files;
   wherein each configuration file of the plurality of configuration files configures the fixed computing device for operation within a corresponding aircraft model of a plurality of distinct aircraft models;
   wherein the predetermined configuration file directs communication between the fixed computing device and the aircraft;
   wherein the fixed computing device is programmed to identify the aircraft and to select the predetermined configuration file based, at least in part, on an identity of the aircraft; and
   an aircraft comprising the aircraft information system and a fuselage that includes a flight deck and a cabin; at least one wing; and at least one engine.

2. The system of claim 1, wherein the system further includes:
   a fixed device wireless interface configured to provide wireless connectivity for the fixed computing device; and
   at least one portable computing device that includes a portable device wireless interface configured to provide access to at least one of the cabin function interface and the mechanic function interface of the fixed computing device.

3. The system of claim 2, wherein the system further includes a forward display positioned within a flight deck of the aircraft, wherein the at least one portable computing device is configured to control information displayed on the forward display.

4. The system of claim 2, wherein the fixed computing device is programmed to provide both the cabin function interface and the mechanic function interface within a web browser interface.

5. The system of claim 2, wherein the aircraft information system is configured to permit the cabin attendant to communicate with the fixed computing device, via the at least one portable computing device, while the aircraft is in flight.

6. The system of claim 2, wherein the aircraft information system is configured to permit the mechanic to communicate with the fixed computing device, via the at least one portable computing device, at least one of during repair of the aircraft and during maintenance of the aircraft.

7. The system of claim 2, wherein the at least one portable computing device is configured to provide access to at least one of the cabin function interface and the mechanic function interface from a cabin of the aircraft.

8. The system of claim 2, wherein the at least one portable computing device is configured to provide access to at least one of the cabin function interface and the mechanic function interface from a flight deck of the aircraft.

9. The system of claim 2, wherein the at least one portable computing device is configured to provide access to at least one of the cabin function interface and the mechanic function interface from external the aircraft.

\* \* \* \* \*